US008255098B2

(12) United States Patent  
Jones et al.

(10) Patent No.: US 8,255,098 B2
(45) Date of Patent: Aug. 28, 2012

(54) VARIABLY MANNED AIRCRAFT

(75) Inventors: Richard D Jones, Issaquah, WA (US); David A. Whelan, New Port Coast, CA (US); Lynne L. Wenberg, Seattle, WA (US)

(73) Assignee: The Boeing Company, Chicago, IL (US)

(*) Notice: Subject to any disclaimer, the term of this patent is extended or adjusted under 35 U.S.C. 154(b) by 483 days.

(21) Appl. No.: 11/874,082

(22) Filed: Oct. 17, 2007

(65) Prior Publication Data

US 2009/0105891 A1  Apr. 23, 2009

(51) Int. Cl.
*G05D 1/00* (2006.01)

(52) U.S. Cl. ............ 701/11; 701/23; 244/76 R; 340/945

(58) Field of Classification Search .................. 701/1, 2, 701/11, 14–16, 23, 24, 36, 200, 207, 213, 701/300, 301; 340/945, 947, 961, 963, 971; 244/3.15, 3.21, 75.1, 76 R, 175, 183, 189, 244/190, 194, 196
See application file for complete search history.

(56) References Cited

U.S. PATENT DOCUMENTS

| 2,322,225 | A | 6/1943 | Crane et al. |
| 2,612,331 | A | 9/1952 | Frazier |
| 3,094,299 | A | 6/1963 | Bond |
| 4,642,774 | A | 2/1987 | Centala et al. |
| 5,631,640 | A | 5/1997 | Deis et al. |
| 5,798,695 | A | 8/1998 | Metalis et al. |
| 6,112,141 | A | 8/2000 | Briffe et al. |
| 6,424,889 | B1 | 7/2002 | Bonhoure et al. |
| 6,739,556 | B1* | 5/2004 | Langston ............ 244/189 |
| 6,845,302 | B2* | 1/2005 | Moretto ............... 701/3 |
| 2003/0191561 | A1 | 10/2003 | Vos |
| 2004/0021581 | A1 | 2/2004 | Weigl |
| 2005/0004723 | A1 | 1/2005 | Duggan et al. |
| 2005/0230564 | A1* | 10/2005 | Yamane ............. 244/183 |
| 2006/0025899 | A1 | 2/2006 | Peckham et al. |
| 2006/0041345 | A1 | 2/2006 | Metcalf |
| 2007/0221782 | A1* | 9/2007 | Cerchie et al. ......... 244/75.1 |
| 2008/0142642 | A1 | 6/2008 | Marino et al. |
| 2009/0171518 | A1* | 7/2009 | Yamane ............. 701/15 |

FOREIGN PATENT DOCUMENTS

| EP | 1422680 | 5/2004 |
| EP | 1586969 | 10/2005 |
| JP | 2001266297 (A) | 9/2001 |

OTHER PUBLICATIONS

Extended EP Search Report for Application No. EP08166826, dated Jan 30, 2009, 7 pgs.

* cited by examiner

*Primary Examiner* — Helal A Algahaim

(74) *Attorney, Agent, or Firm* — Caven & Aghevli LLC

(57) ABSTRACT

In accordance with an embodiment, a system includes a plurality of subsystems cooperatively configured to control an aircraft in accordance with a plurality of manning modes, the system configured to perform fully automated control of the aircraft while operating in any of the plurality of manning modes, wherein the plurality of manning modes include: two onboard operators; one onboard operator; and no onboard operator, wherein the system receives input from a remotely located operator by way of wireless signals.

12 Claims, 6 Drawing Sheets

VARIABLY MANNED AIRCRAFT

FIELD OF THE DISCLOSURE

The field of the present disclosure relates to aircraft control systems, and more specifically, to aircraft control systems that fully automate various aircraft operations in accordance with various modes of manning an aircraft.

BACKGROUND OF THE DISCLOSURE

Costs associated with providing a trained and qualified cockpit flight crew are a substantial portion of the recurring costs of aircraft operation. Flight crew, and especially pilot, reduction in at least some portion of flight operations may significantly reduce aircraft operating costs, either by reducing the number of aircraft personnel, or by freeing up the pilots to perform other, mission-related tasks.

Un-manned vehicle flight has been demonstrated in a variety of platforms in support of military operations and as experimental aircraft. Modern aircraft manufacturers have developed and demonstrated some of the enabling technologies needed to support flight crew and/or pilot reduction. However, these demonstrated technologies have not been integrated into a system and method of operation that can adequately support and efficiently implement variably manned flight operations.

Therefore, improved automated flight control systems and methods of operations, would have great utility.

SUMMARY

Flight control systems and methods of use in accordance with the teachings of the present disclosure can be used to provide partially to fully automated flight control of transport (passenger and/or cargo) aircraft. Other types of aircraft (military, firefighting, helicopters, etc.) can also be equipped and operated in accordance with the present teachings. Embodiments of flight control systems of the present disclosure may be configured to receive input from and provide information to (i.e., cooperate with) one or two onboard operators (typically, pilot and copilot), as well as a remote operator by way of wireless signals.

The ability to variably man an aircraft under the present disclosure provides greater mission flexibility, allowing the flight commander to choose the appropriate level of aircraft manning based on mission importance, difficulty or risk. Variably manning allows manned ferrying of vehicles capable of unmanned operations within airspace that would otherwise prohibit unmanned operations. Variable manning also allows a gradual integration of unmanned vehicles within existing customer mission operations. Vehicles equipped with controls of the present disclosure can be operated as manned aircraft in the initial development and deployment periods, and thereafter shifted toward full unmanned operations as a customer (military, commercial, etc.) becomes comfortable in the operation of such vehicles.

Several technologies are necessary to provide variable flight manning. These technologies include modifications to the cockpit of an aircraft so that many or all pilot inputs that might otherwise require human mechanical operation can be commanded via software and/or other electronic control. Thus, software, dedicated system, and mixed software and dedicated electronics embodiments of the present disclosure are contemplated. Such input devices include, for example, the mode selector of the autopilot system, the flap control handle, the throttle levers, landing gear deployment and stowage handle, fire suppression system activation, radio and navigation frequency and selector controls, etc. Also, primary flight controls (i.e., yoke and rudder pedals) must be commanded by software and/or other automation means.

In one embodiment, a system comprises a plurality of subsystems that are cooperatively configured to control an aircraft in accordance with a plurality of manning modes. The system is configured to perform fully automated control of the aircraft while operating in any of the plurality of manning modes. These manning modes include two onboard operators, one onboard operator, and no onboard operator. In the case of no onboard operator, the system receives input from a remotely located operator by way of wireless signals.

In another embodiment, a method includes controlling an aircraft in accordance with any of a plurality of manning modes. The controlling includes fully automated control of the aircraft during one or more phases of travel. As used herein, phases of travel may include cruising flight, takeoff, landing, collision avoidance, and taxi operations. Also, the plurality of manning modes includes two onboard operators, one onboard operator, and no onboard operator. In the case of no onboard operator, control input is received from a remotely located operator by way of wireless signals.

In yet another embodiment, a computer-readable storage media includes a computer-readable code. The computer-readable code is configured to cause one or more processors to control an aircraft in accordance with a plurality of manning modes. The plurality of manning modes includes two onboard operators, one onboard operator, and no onboard operator. The one or more processors receive input from a remotely located operator by way of wireless signals during operation with no onboard operator. Also, the computer-readable code is configured to cause the one or more processors to perform fully automated control of the aircraft while operating in at least one of the plurality of manning modes.

The features, functions, and advantages that are discussed herein can be achieved independently in various embodiments of the present disclosure or may be combined various other embodiments, the further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure introduces flight control systems and methods of operation using such systems. Many specific details of certain embodiments of the disclosure are set forth in the following description and in FIGS. 1-6 to provide a thorough understanding of such embodiments. One skilled in the art, however, will understand that the disclosure may have additional embodiments, or that the disclosure may be implemented without several of the details described in the following description.

Figure 1:
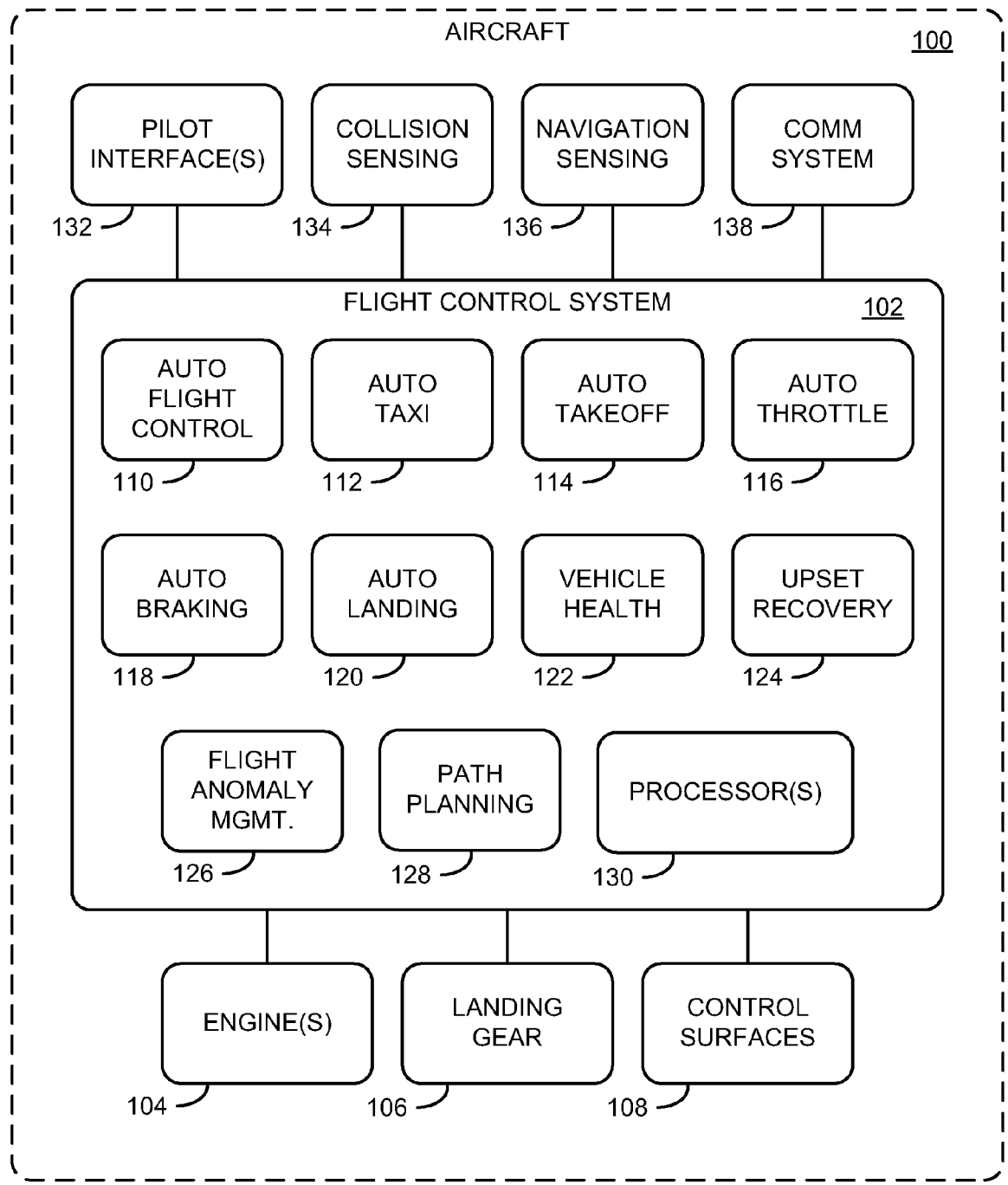
FIG. 1 is a block diagrammatic view depicting an aircraft having a control system according to an embodiment of the disclosure.

Exemplary Systems: FIG. 1 is a block diagrammatic view of an aircraft 100 having a flight control system (control system) 102 in accordance with an embodiment of the disclosure. As used herein, the term exemplary denotes an example, and not necessarily an ideal. The aircraft includes one or more engines 104, landing gear 106, and control surfaces 108, and may be classified as a transport aircraft capable of carrying passengers and/or non-flight-related cargo (e.g., luggage, parcels, etc.). One of ordinary skill in the aeronautical engineering arts is familiar with various embodiment of the respective elements 104-108, and further elaboration is not required for purposes herein. The control system 102 includes a plurality of subsystems and resources that are cooperatively configured to automatically control essentially all operational aspects of the aircraft 100. That is, the control system 102 is configured to variably (partially or fully) automate various phases of travel of the aircraft 100 such that little or no operator input (i.e., intervention) is required.

The control system 102 of FIG. 1 also includes a flight control subsystem 110. The flight control subsystem 110 is configured to function in a ready, autonomous manner, keeping track of various aspects of aircraft 100 operation. The flight control subsystem 110 is further configured to implement fully automated control of the aircraft 100 (or select subsystems thereof) in the event that such high-level automation is requested by an operator or becomes necessary in an emergency response situation. In this way, the flight control subsystem 110 cooperatively couples several of the control subsystems (described hereinafter) and their respective functions such that the control system 102 is capable of overall control, but operates in accordance with the present manning or operation mode of the aircraft 100.

The control system 102 includes an auto (i.e., automatic) taxi subsystem 112. The auto taxi subsystem 112 is configured to automatically control ground-based travel of the aircraft 100 while, for example, proceeding from a gateway area to a designated runway for takeoff, travel to a gateway area after landing, etc. The auto taxi subsystem 112 controls and/or cooperates with engines 104, the steering of landing gear 106, etc., as needed to perform the automated taxi function. The control system 102 also includes an auto takeoff subsystem 114, which is configured to automatically control takeoff procedures of the aircraft 100. Such takeoff procedures can include, for example, control of the engine(s) 104 and/or control surfaces 108, the raising of landing gear 106, the modulation of engine thrust in accordance with noise abatement procedures for the particular airport, etc.

The control system 102 of FIG. 1 also includes an auto throttle subsystem 116. The auto throttle subsystem 116 is configured to automatically modulate engine(s) 104 thrust in accordance with one or more optimum modes of operation such as, for example, most fuel-efficient flight, fastest flight, slowest safe flight, etc. The control system 102 further includes an auto braking subsystem 118, configured to control braking of the aircraft 100 during landing operations, while taxiing about the runway area, etc. The control system 102 also includes an auto landing subsystem 120. The auto landing subsystem 120 is configured to control landing of the aircraft 100. Thus, the auto landing subsystem 120 cooperates with engine(s) 104, control surfaces 108 and other aspects as needed to safely land the aircraft 100 in a fully automated manner.

The flight control system 102 of FIG. 1 includes a vehicle health management (health) subsystem 122. The health subsystem 122 is configured to monitor numerous conditions about the aircraft 100 including, but not limited to, electrical power generation, battery storage voltages, hydraulic control pressures, passenger cabin oxygen and/or atmospheric pressure levels, fire and/or smoke detection, vibration sensing, fuel level and consumption rate sensing, etc. The health subsystem functions to provide status information and alerts to other subsystems of the control system 102 as needed and in accordance with predetermined criteria. The control system 102 of also includes an upset recovery subsystem 124 configured to provide fast, automatic response and correction of abnormal or unanticipated conditions during travel of the aircraft 100. Non-limiting examples of such abnormal or unanticipated conditions include wind-shear, lightning strike, loss of stable flight attitude, loss of function and/or communication with one or more subsystems, drop in control hydraulic pressure, etc. The upset recovery subsystem 124 cooperates with other subsystems such that appropriate correctional control of the engine(s) 104, landing gear 106 and/or control surfaces 108 is performed.

The flight control system 102 also includes a flight anomaly management (anomaly) subsystem 126. The anomaly subsystem 126 is configured to monitor numerous operational aspects of the aircraft 100, and to calculate a contingency response in the event that an anomalous condition is detected. Non-limiting examples of such anomalous conditions include loss (significant decrease) in hydraulic pressure, detection of other air vehicles in near proximity to the aircraft 100, sudden loss of electrical generation, loss of control of a control surface, etc. The anomaly subsystem 126 further cooperates with other subsystem of the control system 102 in order to automatically implement the calculated contingency response, with or without operator intervention.

The flight control system 102 of FIG. 1 further includes a path planning subsystem 128. The path planning subsystem 128 works to calculate and plot a flight path for the aircraft 100 to a predetermined (operator and/or automatically selected) location. The path planning subsystem 128 also works in cooperation with other subsystems of the flight control system 102 as explained in further detail hereinafter. The flight control system 102 further includes one or more processors 130. The one or more processors 130 are configured to function in accordance with a computer-readable code provided to the flight control system 102 by way of computer-readable storage media. While not depicted in FIG. 1, one of skill in the computing and control arts can appreciate that such computer-readable storage media includes, but is not limited to, solid state memory, optical storage media, magnetic storage media, etc. Other suitable forms of computer-readable storage media can also be used in accordance with the particular embodiment of control system 102. In any case, one or more of the subsystems 110-128 can be implemented, at least in part, by executable program code provided to the one or more processors 130 by way of suitable computer-readable storage media (i.e., software).

The aircraft 100 of FIG. 1 further includes one or two pilot (i.e., operator) interfaces 132 in respective communication with the flight control system 102. Each pilot interface 132 is configured to permit operator input to the control system 102 in a straightforward and intuitive manner. Thus, each operator interface 132 can include, for example: a wheel, "stick" or joystick input, operations instrumentation, a heads-up display, etc., as needed to facilitate human user cooperation with the control system 102 while flying the aircraft 100. In this way, flight operations can be performed with varying degrees of automation in accordance with the present manning mode of the aircraft 100. The aircraft 100 also includes collision sensing resources 134. The collision sensing resources 134 are configured to detect near-proximity aircraft, topographical features, and other collision hazards. The collision sensing and avoidance resources 134 are further configured to communicate that information to the flight anomaly management subsystem 126 and/or other subsystems of the control system 102 so that appropriate collision or crash avoidance measures can be automatically implemented. Pertinent information can be communicated to or exchanged with near-proximity air vehicles as a part of an overall and/or situation-specific collision avoidance scheme.

The aircraft 100 also includes navigation sensing resources 136. The navigation sensing resources 136 are configured to detect, as non-limiting examples, global positioning signals, radio navigation signals, celestial objects, etc., and to communicate that sensed information to the flight control system 102. A communications system 138 is configured to perform bidirectional wireless communication between the aircraft 100 and external entities. Such wireless signals can include, for example, satellite signals, shortwave radio signals, etc. The communication system 138 is considered in the aggregate and can include analog data, digital data, voice and/or video communications modes. The resources 132-138, inclusive, are depicted in FIG. 1 as external to the flight control system 102 in the interest of conceptual clarity. However, any one or more of the respective resources 132-138 can be considered a portion or extension of the flight control system 102.

The aircraft 100 can includes other features as needed to enable passenger and/or cargo transport. As used herein, such cargo is considered non-flight-related cargo having nothing to do with the operation of the aircraft 100. In one or more embodiments, the aircraft 100 is a commercial airliner that is suitably equipped with the flight control system 102 of FIG. 1 or another flight control system embodiment consistent with the present disclosure. Thus, the automatic control and variable manning modes presented herein are envisioned to be embodied, for example, within various forms of commercial passenger airliner, cargo-carrying and/or military aircraft. The aircraft 100 of FIG. 1 and control system 102 thereof are non-limiting exemplary embodiments of the present disclosure. Other embodiments of flight control system and correspondingly equipped aircraft are envisioned having corresponding variations on the teachings presented above. However, automated control of one or more phases of aircraft operation (e.g., takeoff, landing, cruising flight, collision avoidance, etc.), in cooperation with one or two onboard operators, or a ground-based remote-control operator, are within the scope of all such embodiments of the present disclosure.

Exemplary Operations: The aircraft 100 of FIG. 1 is capable of operating in a plurality of manning modes and at various levels of automated travel by virtue of the flight control system 102 and its respective subsystems and resources. Hereinafter, just a few exemplary usage operations are presented so that the scope of the present disclosure is more fully appreciated.

Figure 2:
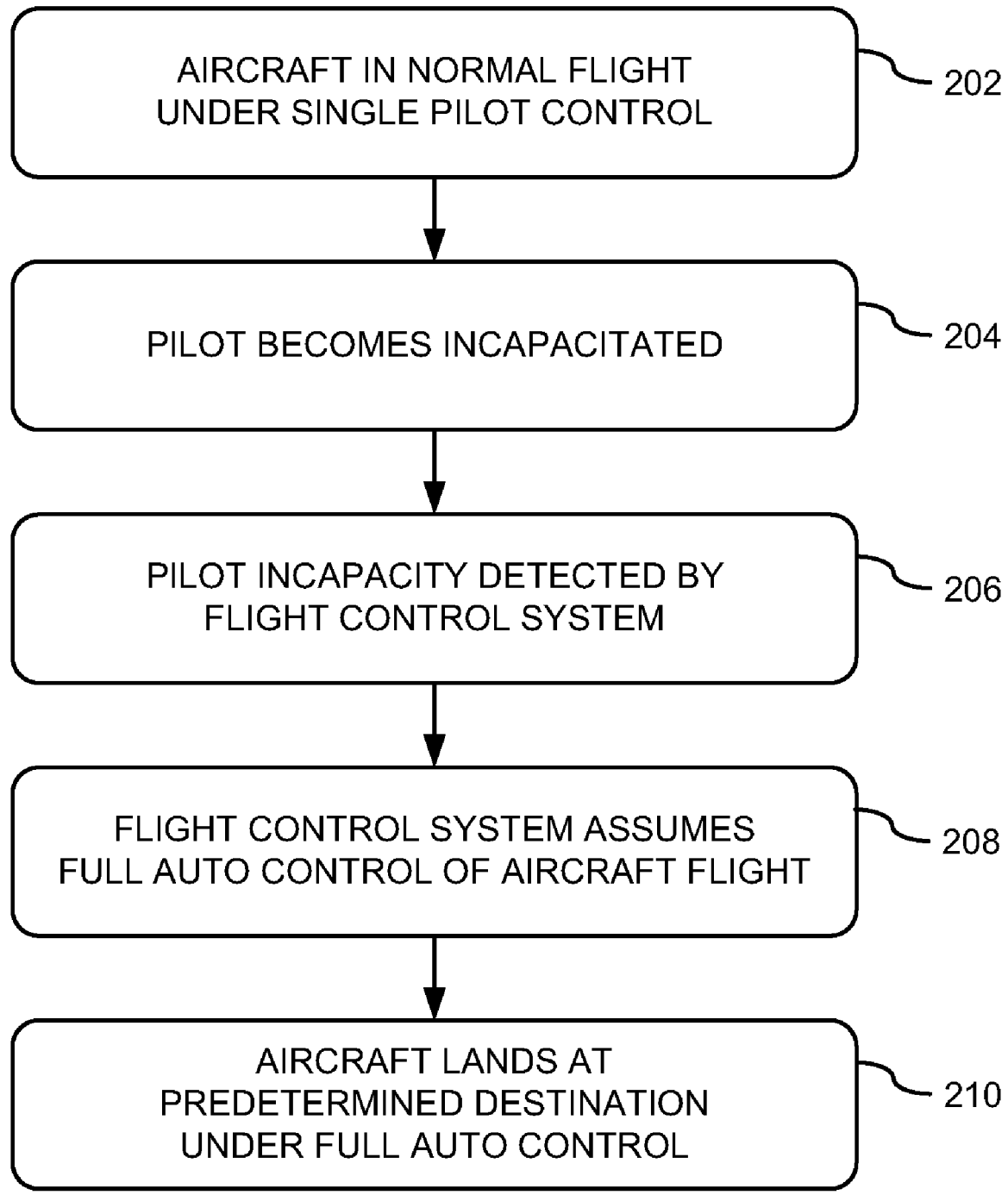
FIG. 2 is a flowchart depicting a method of operation in accordance with one embodiment.

FIG. 2 is a flowchart depicting an exemplary method of operation in accordance with the present disclosure. While the method of FIG. 2 depicts particular steps and order of execution, other embodiments can be defined and used that are suitably varied from that depicted in FIG. 2. The method of FIG. 2 will be explained below with reference to the elements of FIG. 1 for purposes of understanding.

At 202, an aircraft 100 is operating in normal flight under a single onboard operator (pilot) control, toward a predetermined destination. Thus, the onboard operator is inputting commands to and receiving information from a flight control system 102 of the aircraft 100. In turn, the control system 102 is performing partially and/or fully automated control of certain flight operations in accordance with the operator's input. The control system 102 has been previously informed of the predetermined destination (e.g., prior to departure, etc.) and is thus aware of at least this mission objective.

At 204, the onboard operator (pilot) becomes incapacitated due to injury, illness, etc., and cannot interact with the control system 100 of the aircraft 100 in a constructive or coherent way (if at all).

At 206, the flight control system 102 detects the operators incapacity by way of, for example, a "dead man switch", failure to answer a periodic operator welfare inquiry, failure to respond to radio communications traffic, etc. Other suitable means for detecting operator (i.e., pilot) incapacity can also be used.

At 208, the flight control system 102 assumes full automated control of the aircraft 100. Thus, the control system 102 has essentially replaced the operator's input with its own calculations and determinations as to how to proceed in flight toward the predetermined destination. Also, the control system 102 may communicate the operator's incapacitated state to a ground-based flight control location and/or other aircraft in the general area.

At 210, the flight control system 102 lands the aircraft at the predetermined destination under full automatic control. Such control includes, for example, sequential reduction of engine thrust, lowering of landing and nose gear, powered braking and deceleration upon set down, etc. The control system 102 can also perform automated taxi toward an emergency procedures or medical care station at the airport, etc.

The method of FIG. 2 just described provides for full automatic takeover of flight operations in the event that an onboard operator becomes unable to fly the aircraft or meaningfully interact with the flight control system. However, other operational scenarios are envisioned wherein remote operator control (input and communication) are desired or required (by law, as a mission-critical aspect, etc.) instead of fully automated flight. At least one such exemplary scenario is described hereinafter.

Figure 3:
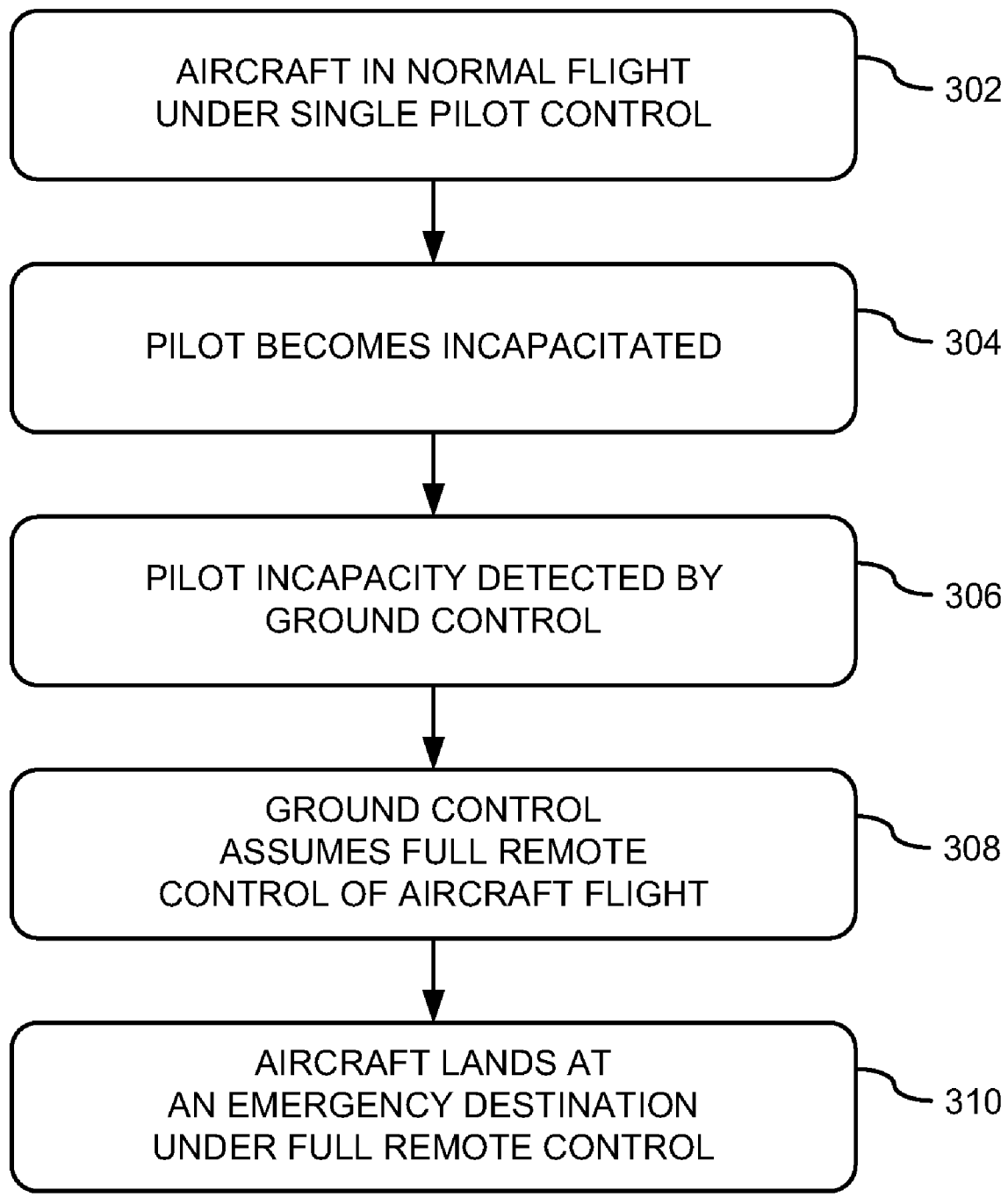
FIG. 3 is a flowchart depicting a method of operation in accordance with another embodiment.
Figure 4:
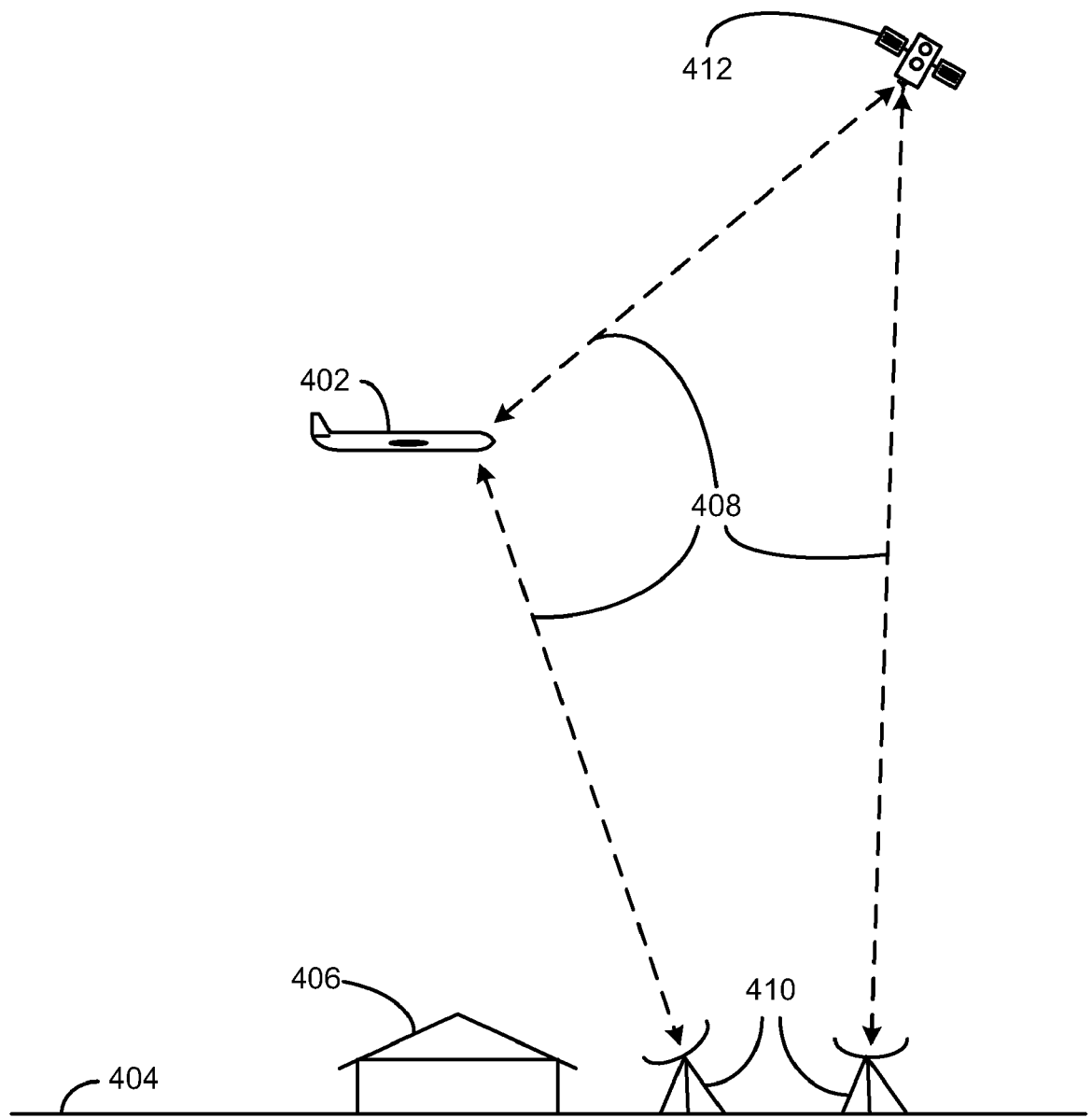
FIG. 4 is an elevation schematic view depicting exemplary operations in accordance with the method of FIG. 3.

FIG. 3 is a flowchart depicting another exemplary method of operation in accordance with the present disclosure. In turn, FIG. 4 is an elevation schematic view depicting operational elements according to the method of FIG. 3. While the method of FIG. 3 depicts particular steps and order of execution, other embodiments can be defined and used that are suitably varied from that depicted in FIG. 3. The method of FIG. 3 will be explained with reference to the situation 400 of FIG. 4 for purposes of understanding.

At 302, an aircraft 402 is in normal flight over a ground surface 404. The aircraft 402 includes a flight control system such as, for example, the control system 102 of FIG. 1. The aircraft 402 is capable of flight under various degrees of automatic control in accordance with the manning (flight crew) thereof. For purposes herein, it is assumed that the aircraft 402 is operated by a single person (pilot).

At 304, the operator becomes incapacitated due to illness, serious injury, etc., and cannot constructively function (if at all) to control the aircraft 402.

At 306, the operator's incapacity is detected by a ground-based mission control (ground control) 406. Ground control 406 is in ongoing communication with the aircraft 402 by way of wireless communication (voice and/or video) and control signals 408. Such ongoing wireless communication is facilitated by way of ground-based antennas 410, possibly by way of satellite 412. In any case, ground control 406 is aware of the situation aboard the aircraft 402 and begins to react.

At 308, ground control assumes full remote control of the aircraft 402 by way of wireless signals 408 received by the control system (e.g. 102, etc.) of the aircraft 402. In response, the control system of aircraft 402 provides automated flight control in accordance with commands input from the ground control 406. For purposes herein, it is assumed that ground control 406 instruct the aircraft 402 control system to abort its present flight plan and land at an emergency destination.

At 310, the aircraft 402 performs a remotely controlled landing at the emergency destination, consistent with instructions receive from ground control 406. In one embodiment, such a landing can include actual remote operator control of the aircraft (wheel, control surfaces, engine thrust, etc.). In another embodiment, the aircraft 402 lands under fully automated control by way of the associated control system. Regardless of the particular degree of automatic control implemented under the particular circumstance, the aircraft 402 safely lands despite the incapacitated nature of the sole onboard operator (pilot). Remote monitoring and/or operator intervention is performed and/or possible throughout the emergency operation.

Figure 5:
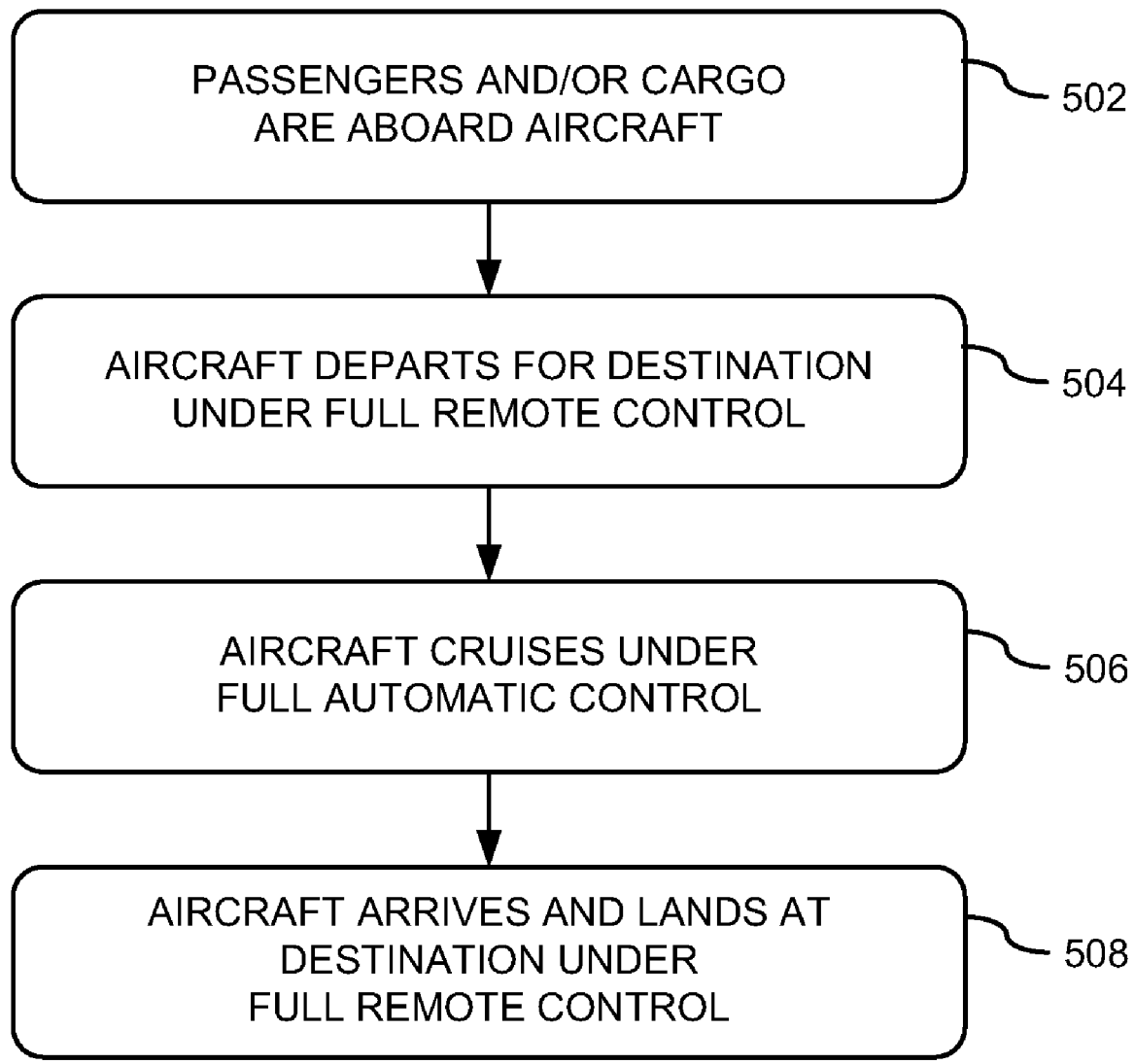
FIG. 5 is a flowchart depicting a method of operation in accordance with still another embodiment.

FIG. 5 is a flowchart depicting yet another exemplary method of operation in accordance with the present disclosure. While the method of FIG. 5 depicts particular steps and order of execution, other embodiments can be defined and used that are suitably varied from that depicted in FIG. 5. The method of FIG. 5 will be explained with reference to the elements of FIG. 1 for purposes of understanding.

At 502, passengers (non-operators) board an aircraft 100 during a preflight phase at an air terminal. Additionally, non-flight-related cargo (e.g., luggage, food items, beverages, etc.) is loaded aboard the aircraft 100 prior to departure. It is presumed that the aircraft 100 includes a flight control system 102 (or another embodiment consistent with the present disclosure).

At 504, the aircraft 100 departs for a predetermined destination under full remote control. During this departure phase of travel, a ground control (e.g., 406 of FIG. 4) is in wireless communication with the control system 102 of the aircraft 100. In turn, the control system 102 provides for automated flight control in response to commands input from the ground control. Such ground-based remote control during departure can be required, for example, to comply with flight related laws or mission-critical criteria. In any case, it is understood that there are no qualified flight crew personnel (i.e., no pilot nor copilot) aboard the aircraft at anytime during flight.

At 506, the aircraft 100 receives input from ground control instructing the control system 102 to assume fully automated cruising flight. This can be performed, for example, once the aircraft 100 reaches cruising altitude under the more direct mode of remote operator control at 504 above. At this point, ground control will assume a more passive role, serving to monitor flight progress by way of communications from the aircraft 100 as it travels toward its predetermined destination.

At 508, input is received from ground control instructing the control system 102 to relinquish fully automated control and to provide for remote operation of the aircraft 100. This can be performed, for example, in compliance with regulations, mission objectives, etc. In response, the control system 102 assumes a role subservient to remote operator input and the aircraft 100 is landed largely (if not entirely) under remote operator influence.

Figure 6:
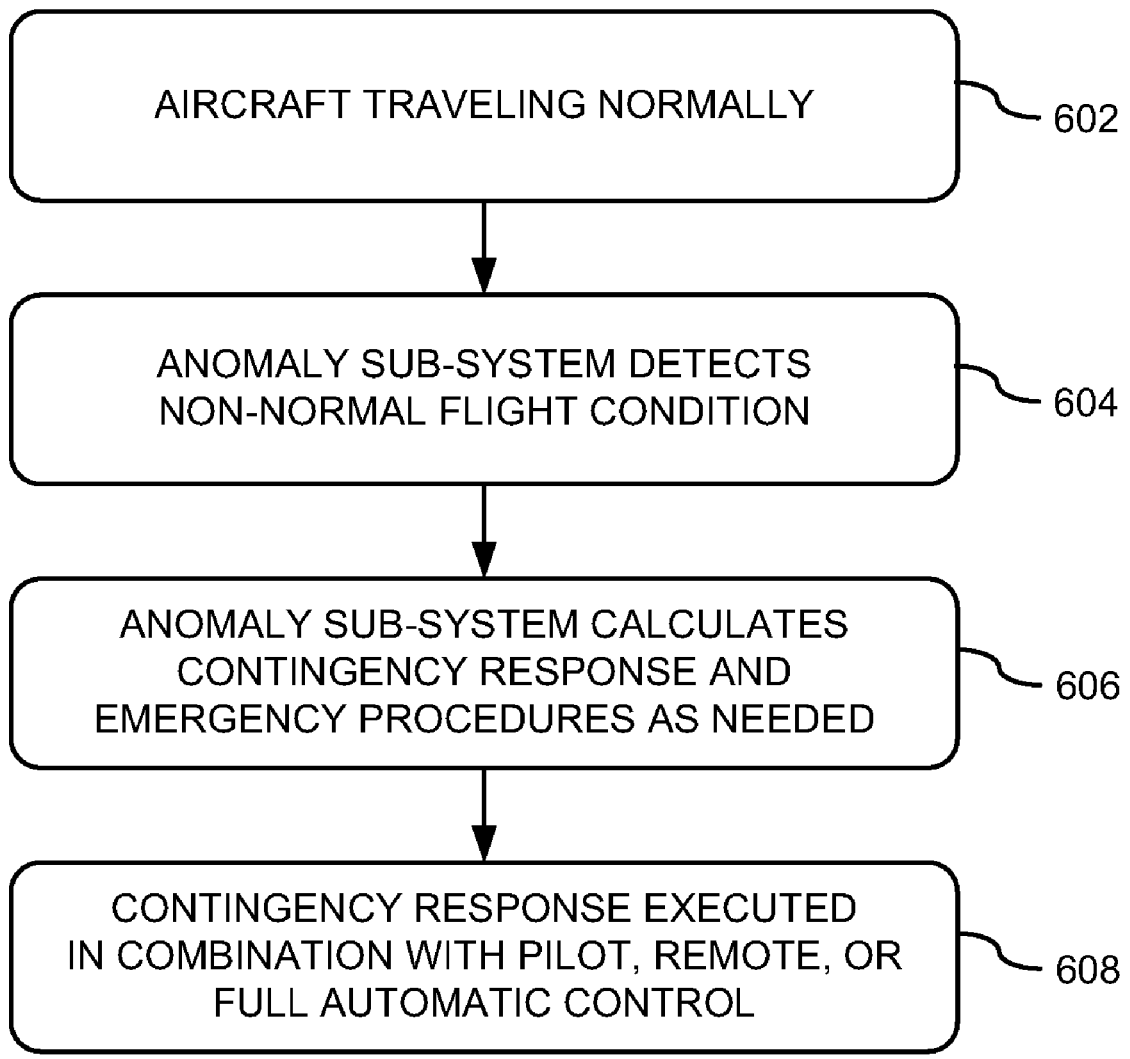
FIG. 6 is a flowchart depicting a method of operation in accordance with another embodiment.

FIG. 6 is a flowchart depicting still another exemplary method of operation in accordance with the present disclosure. While the method of FIG. 6 depicts particular steps and order of execution, other embodiments can be defined and used that are suitably varied from that depicted in FIG. 6. The method of FIG. 6 will be explained with reference to the elements of FIG. 1 for purposes of understanding.

At 602, an aircraft 100 is traveling under normal flight conditions toward a predetermined destination. The aircraft 100 includes a flight control system 102. For purposes of example, it is assumed that the aircraft 100 includes two flight operators (pilot and copilot) onboard.

At 604, the anomaly subsystem 126 of the aircraft 100 detects a non-normal flight condition. For purposes of example, it is presumed that the anomaly subsystem is informed by the vehicle health subsystem 122 that fuel quantities are decreasing at a rate higher than anticipated by present engine output. Such decreasing quantities are presumed indicative of a leak in the fuel system. In any case, the anomaly subsystem 126 is "aware" of abnormal circumstances and begins to react.

At 606, the anomaly subsystem 126 calculates a contingency response to the detected non-normal condition. In the present example, the anomaly subsystem 126 determines an estimated available flight range of the aircraft from its present position in view of engine loading, rate of fuel loss, and other relevant factors. The anomaly subsystem 126 also determines that two emergency landing sites (i.e., airports) are within range and suitably equipped to handle the situation upon landing.

At 608, the flight control system 102 informs the onboard flight crew of the fuel loss situation and requests operator input to select from the two emergency landing sites. Once a selection is made (by the pilot, etc.), the control system 102 executes the contingency response plan under a significant degree of automated control of the aircraft 100. In the ongoing example, the aircraft 100 is automatically rerouted to the second emergency airport calculated (determined) at 606 above. Upon arrival, the control system 102 can execute a fully automated landing of the aircraft 100, if such is requested by the onboard flight crew. Furthermore, the control system 102 automatically communicates with ground control to inform them of the situation and the contingency response being executed. In this way, ground-based emergency response teams are alerted to the impending needs of the aircraft 100 prior to its arrival at the selected emergency landing site.

The method of FIG. 6 is illustrative of any number of possible detect-and-respond scenarios that can be automatically handled, to some degree, by control system embodiments of the present disclosure. Thus, significant non-normal flight events aboard a suitably controlled aircraft can be handled with limited or no onboard or remote operator intervention. Such automated contingency response relieves a flight crew of stressful analysis and decision making, thus largely—if not completely—eliminating operator error under critical circumstances.

While specific embodiments of the disclosure have been illustrated and described herein, as noted above, many changes can be made without departing from the spirit and scope of the disclosure. Accordingly, the scope of the disclosure should not be limited by the disclosure of the specific embodiments set forth above. Instead, the scope of the disclosure should be determined entirely by reference to the claims that follow.

What is claimed is:

1. A flight control system, comprising:
a plurality of subsystems cooperatively configured to:
monitor operations of an aircraft that is controlled by at least one onboard pilot, the monitored operations including at least one of health of the aircraft, activity of the at least one onboard pilot, and progress of a mission objective;

determine an event based on an anomaly of one of the monitored operations, the event to initiate a subsequent fully automated control of the aircraft;

receive an input from the at least one onboard pilot of the aircraft, the input in response to the event and used by the flight control system when implementing the subsequent fully automated control of the aircraft, wherein the input is a selection of one of a plurality landing sites for the aircraft; and engage in control of the aircraft by performing fully automated control of the aircraft based at least in part on the input, the fully automated control to occur with an omission of additional inputs from the at least one onboard pilot.

2. The flight control system of claim 1, wherein the fully automated control of the aircraft includes:
fully automated landing, and
fully automated cruising flight.

3. The flight control system of claim 1, wherein the mission objective is completed by having the plurality of subsystems cooperatively land the aircraft at a predetermined destination.

4. The flight control system of claim 1, wherein the plurality of subsystems are further configured to:
calculate at least two contingency response controls in response to the anomaly of one of the monitored operations; and
provide the at least two contingency response controls to the at least one onboard pilot for selection as the input.

5. The flight control system of claim 4, wherein the at least two contingency responses include at least one of:
landing the aircraft at a location different than a predetermined destination, communicating the anomaly of one of the monitored operations to a remote entity by way of wireless signals, and
rerouting the aircraft along a flight path different than a predetermined flight path.

6. The flight control system of claim 1, wherein the plurality of subsystems includes at least one of an onboard operator interface, a collision sensing subsystem, an automated navigation subsystem, a communications subsystem, a path planning subsystem, an auto flight control subsystem, an upset recovery subsystem, a vehicle health management subsystem, a flight anomaly management subsystem, an auto landing subsystem, an auto taxi subsystem, an auto throttle subsystem, an auto takeoff subsystem, and an auto braking subsystem.

7. The flight control system of claim 6, wherein the onboard operator interface includes at least one of a wheel, a yoke, rudder pedals, a joystick, and a heads-up display.

8. A method, comprising:
monitoring flight control operations of an aircraft that is controlled by at least one onboard pilot;
switching control of the aircraft to fully automated control of the aircraft by a flight control system during one or more phases of travel when an anomaly is detected during the monitoring of the flight control operations;
providing, in response to the switching control, a list of selections for user input to the at least one onboard pilot; and
receiving an input from the list of selections from the at least one onboard pilot subsequent the occurrence of the anomaly, the input being used at least in part by the flight control system to execute the fully automated control of the aircraft.

9. The method of claim 8, wherein the one or more phases of travel includes at least one of: fully automated takeoff, fully automated landing, and fully automated cruising flight.

10. The method of claim 8, wherein the input is a selection of one of a plurality landing sites of the aircraft.

11. The method of claim 8, further comprising:
calculating at least two contingency responses to the anomaly; and
provide the at least two contingency responses to the at least one onboard pilot for selection as the input.

12. The method of claim 11, wherein the at least two contingency responses include at least one of: landing the aircraft at a location different than a predetermined destination, communicating the anomaly to a remote entity by way of wireless signals, and rerouting the aircraft along a flight path different than a predetermined flight path.

* * * * *